Dec. 11, 1928.
J. W. HORTON
1,695,047
ART OF ELECTRICAL MEASUREMENTS
Filed Nov. 4, 1924
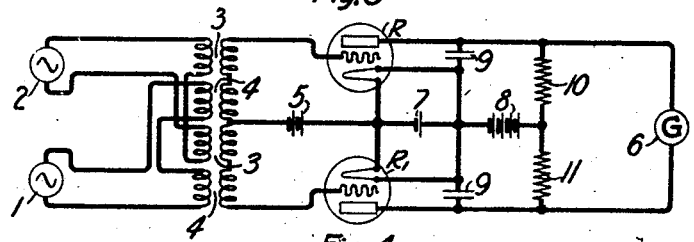
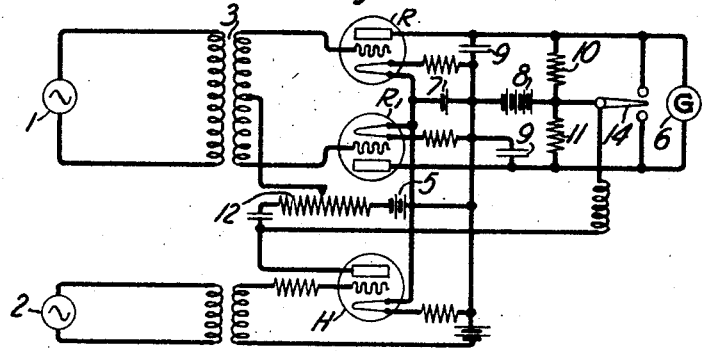
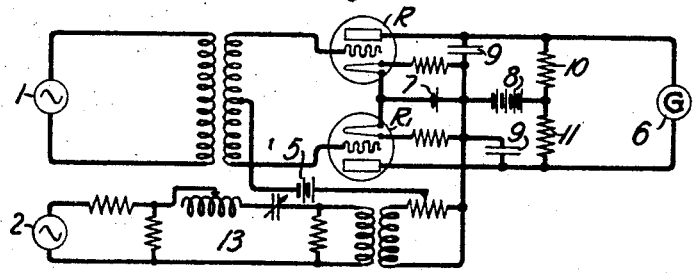
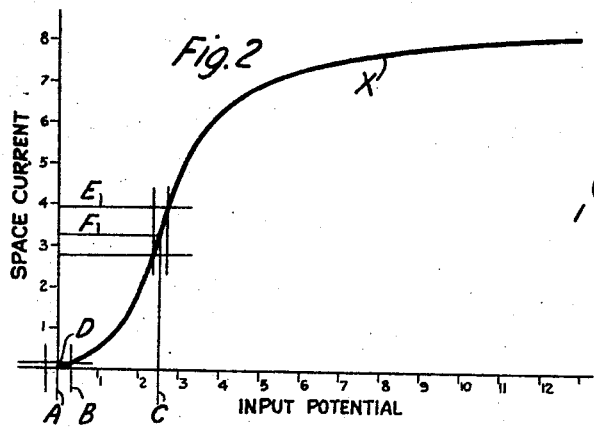
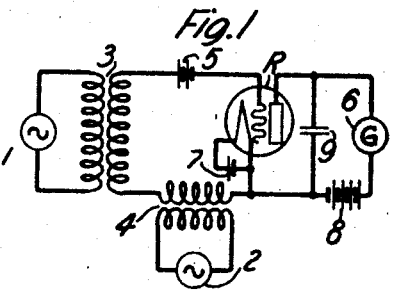
Inventor
Joseph W. Horton
by   Atty.

Patented Dec. 11, 1928.

1,695,047

UNITED STATES PATENT OFFICE.

JOSEPH W. HORTON, OF BLOOMFIELD, NEW JERSEY, ASSIGNOR TO WESTERN ELECTRIC COMPANY, INCORPORATED, OF NEW YORK, N. Y., A CORPORATION OF NEW YORK.

ART OF ELECTRICAL MEASUREMENTS.

Application filed November 4, 1924. Serial No. 747,801.

This invention relates to the art of electrical measurements and particularly to those branches of the art which are concerned with frequency measurement and comparison, and wave analysis.

In a method commonly used for measuring alternating currents having frequencies above those generally used in electric power transmission and distribution, the test current is rectified and impressed on a direct current galvanometer. A rectifier as used throughout this specification may be defined as a means for changing an alternating current into a uni-directional current by either cutting off or reversing the direction of alternate impulses. As applied to a three-electrode electrical discharge device, rectification requires the use of a sufficient negative potential impressed upon the grid of the device to reduce the plate current to zero except during the positive halves of the impressed waves.

There are other methods making use of the asymmetric qualities of a conducting device, which give a resultant integrated unidirectional effect.

The above described method using rectification has, however, at least two advantages over these other methods which depend on integrated effects. When no alternating current is supplied to the rectifier there is no deflection recorded by the meter and if an alternating current is supplied to the rectifier the meter records a deflection which is a function of the impressed currents. Hence the complete scale deflection of the meter can be usefully employed with a consequently greater sensitivity than where the indication is merely a deviation from a mean reading of the meter. Again the rectified current, although variable, is essentially a continuous current so that even for very high frequencies well known types of meters can be used to indicate the rectified current. Types of meters capable of use with alternating current or with the essentially alternating type of current that results from the use of these other methods do not operate efficiently for high, i. e. carrier frequencies.

The method using rectification, has, however, a serious disadvantage when applied to the measurement of very small electrical variations. The slope of the characteristic curve between impressed potentials and output currents of known types of rectifier is so small at or near its foot that the output currents corresponding to the small impressed potentials are too small to produce sensible deflection of the galvanometer needle.

An object of this invention is to provide arrangements whereby these very small alternating variations may be used to produce an appreciable deflection in an indicator.

This object is achieved, in one form of the invention by magnifying the effect of the electrical variations by applying them in such a manner that they are effective over a portion of its characteristic curve where the slope, and hence the amplification, is very much greater. This may be done by superposing the small impulses upon an alternating potential of the same frequency and of a sufficient amplitude to cause the rectifier to operate at a point on the characteristic curve where maximum amplification occurs.

Rectification occurs as before so that the method can be used over as great a range of frequencies as if the boosting potentials were not applied, and with much greater sensitivity.

However, this method results in the superposition of the deflection due to the rectification of the small impulses upon a constant deflection of the meter namely that due to the rectified boosting potentials. Therefore, even though there may be a marked increase in the indication, a less sensitive meter must be used than under conditions where only the variations due to the test potentials are used to affect the meter unless a means is used to measure the differential current only. Such methods as are commonly used in the art to effect this result are not adapted to precise measurement.

According to one form of the invention a balanced arrangement of rectifiers is used to eliminate this constant deflection, so that the meter is affected only by the rectified test currents. This may be accomplished by using two three-electrode electric discharge rectifiers and impressing the boosting potentials on the grids of the two rectifiers in the same phase while impressing the test potentials thereon in opposite phase, the output circuits of the two rectifiers being related to the meter in such manner that the rectified currents due to the boosting potentials neutralize each other and therefore cause no deflection therein whereas the rectified currents due to the test potentials are supplied in additive relation to the meter circuit.

The use of this balanced rectifier results in an additional advantage over an arrangement using a single rectifier in that the deflection due to the rectified test currents is twice as great.

Of course, for maximum deflection in the balanced arrangement, it is important that the phases of the test and booster potentials at any particular instant should be identical with respect to a common time scale. Therefore, the phase differences of the superposed potentials at the respective input electrodes should be zero and 180 degrees. In the case of the single rectifier arrangement it is immaterial whether the phases are the same or differ by 180 degrees since if the phases are the same there will be a change of deflection on account of the positive impulses of the test potentials and if they differ by 180 degrees, a change in deflection on account of the negative impulses.

If the two frequencies are not identical, there will be an oscillation of the needle of the meter at the beat frequency. This expedient may be used to indicate electrical variations too small to be efficiently indicated even by the means above described since, instead of a constant deflection or change of deflection as with the above described means there will be an excursion of the needle in both directions from the mean, the total change in deflection being equal to twice the steady deflection in the other case. The amplitude of this excursion may be increased still further by making use of the natural period of oscillation of the needle, the beat frequency being adjusted to that value. These expedients may be used whether a single rectifier or balanced rectifiers are used but in the latter case the sensitivity will be greatly increased as compared with the former, for the reasons stated, that is, on account of the elimination of the constant deflection and the doubling of the deflection due to the rectified test currents.

Additional objects of the invention are to indicate the phase relation between two periodic electrical variations having the same frequency and to indicate a condition of equality of the frequencies of two periodic electrical variations and therefore to set the frequency of an "unknown" source in accordance with the known or determinable frequency of a standard source.

These objects may be accomplished by the arrangements above described, since equality of frequency is indicated by the absence of a beat and a condition of equal or opposite phase by a maximum deflection, the deflection for other phase relation being decreased accordingly.

Other objects and features of the invention will appear from the following detailed description read in conjunction with the attached drawing in which;

Fig. 1 illustrates a simple circuit which employs the generic principle of the invention;

Fig. 2 illustrates by the use of the input-potential-space-current characteristic curve of a three-electrode electric discharge device, the operation of the system of Fig. 1 and Figs. 3, 4 and 5 each illustrates the application of the principles of the arrangement of Figs. 1 to a balanced rectifier arrangement. They respectively embody a circuit for indicating the phase relation of two periodic electrical variations having the same frequency, a circuit for frequency calibration or comparison, and a circuit for wave analysis.

In Fig. 1, test and booster sources, 1 and 2, respectively are coupled through transformers 3 and 4, to the input circuit of a three-electrode electric discharge rectifier R. In the operation of this device the grid polarizing potential from source 5 is adjusted so that the normal grid potential, that is, the potential when no other potentials are impressed, corresponds to the foot of the input-potential-space current characteristic curve, accordingly, when no periodic potentials are impressed on the grid or when negative half waves of periodic potentials are impressed thereon no current will flow through galvanometer 6 from the source 8 adapted to supply space current to the rectifier.

Battery 7 supplies filament current to the rectifier. Condenser 9 is used to by-pass any alternating current components present in the output of the rectifier around the galvanometer 6 and source 8.

The operation of the arrangement shown in Fig. 1 will be made clear from a consideration of Fig. 2. The curve X is a conventional input-potential-space-current characteristic curve of a three-electrode electric discharge device, the circuits of which have been so adjusted, preferably by controlling the steady potential impressed upon the grid, that the discharge device normally operates about a point at the foot of the curve. In other words, the curve terminates at the intersection of the input potential axis and the space current axis.

Let it be assumed that the maximum potential variation from test source 1 corresponds to input potential A—B, that the maximum variation of the booster potential from source 2 corresponds to input potential A—C. Let it be assumed first that the test potentials alone are being impressed across the input electrodes of the rectifier. During intervals when negative half waves are impressed upon the input electrodes no space current will flow but when positive half waves are impressed upon these electrodes a space current of the value A—D will flow from the source 8 through the indicating galvanometer 6. On account of the fact that the slope of the curve at this point is slight the current supplied to the galvanometer will be insufficient to sensibly deflect its needle.

If now the booster potential is added to that from the test source and if it has the same frequency and phase no space current will flow when negative half cycles of the two waves are impressed upon the input electrodes. However, when positive half cycles of the two waves are effective across the input electrodes a current A—E will flow through the galvanometer. The contribution of the rectified current due to the test source is indicated by F—E while that produced by the current from the booster source is indicated by A—F. Since the natural frequency of oscillation of the moving parts of the meter is small, as compared with the impressed frequency, the galvanometer will register a steady deflection corresponding to these values. That is, there will be a steady deflection of the value A—F when the booster potential is applied and a change to a steady deflection of A—E when the test potential is superposed. Accordingly, by reason of the use of the booster source, the desired indication has been increased from a value A—D to a value F—E. In actual practice this increase has been found to be many hundred percent. The curve illustrated in this figure is typical of the characteristic of commercially used three-electrode electric discharge tubes.

The principle is somewhat the same as that of the homodyne method of detection as described in U. S. patent to Kendall No. 1,330,471, February 10, 1920. It is also similar to that described on page 439 of the second edition of Radio Communication Pamphlet No. 40 (Government publication) with reference to the use of a booster potential with a contact detector to make use of the non-rectilinear property of the characteristic curve. It differs from this latter in that an alternating current, instead of a direct current, booster potential is used, so that the rectification property as well as the non-rectilinear property of the rectifying device is used. As has been pointed out, rectification is necessary to insure proper response of the galvanometer to currents having frequencies higher than those used for ordinary power purposes.

If the two frequencies are caused to differ by a frequency to which the needle of the galvanometer can respond, it will oscillate at that frequency. By the use of this expedient, both the positive and negative half cycles of the test potential can be made effective. If the beat frequency is adjusted to the natural frequency of oscillation of the galvanometer, a large deflection due to resonance will be produced.

In the above described mode of operation, there will be a normal deflection due to the booster potential. When the test potential is applied, if the frequencies are equal, there will be an increase or decrease of deflection depending on whether the phases are generally aiding or opposing, the amount of increase or decrease depending on the particular phase difference. When there is a quadrature relation, the change in deflection will be zero. When there is exact phase identity or opposition, there will be a maximum change of deflection. If the frequencies are different, the excursion of the needle will be twice this maximum change of deflection.

This invention may be used to analyze a complex wave. In this operation, a calibrated variable frequency source supplies the booster potential. The wave to be analyzed is explored by varying the booster frequency through the frequency range of the complex wave. If the booster frequency approaches sufficiently close to the frequency of a component wave, the presence in the wave of such component is indicated by an oscillation of the needle, the violence of oscillation being greatest when the beat frequency coincides with the natural frequency of vibration of the needle. The frequency of the component can be calculated from the known booster current and beat frequencies. If the amplitude of the unknown frequency component is sufficiently great so as not to require the use of the beat to effectively magnify the deflection the booster frequency can be made coincident with the unknown frequency, as is indicated by a steady deflection, the unknown frequency being in this case equal to that of the booster current. The magnitude of the increase of steady deflection, when made a maximum, gives a measure of the amplitude of the component.

Similarly the method of operation may be used to adjust the frequency of an unknown source to the known or determinable frequency of a comparison source. It may also be used to determine or adjust the relative phase of electrical variations supplied by two sources having the same frequencies.

In the system described above, a galvanometer must be provided which is adapted to measure a current corresponding to the rectified booster current plus the rectified test current. Since the booster current is several times as great as the test current, the magnitude of the deflection due to the test circuit will be small as compared with that due to the booster current. As a consequence only a very limited portion of the meter scale will be available for indicating the effect produced by the test current.

Figs. 3, 4 and 5 illustrate arrangements including balanced rectifiers. In these arrangements the rectified booster currents are balanced out, so that the deflections of the meter are produced solely by the rectified test currents and hence the full scale deflection of the meter is available to indicate changes effected by the test currents.

In these figures, the parts having functions corresponding to those of Fig. 1 will be correspondingly labeled and only so much of the circuits as is specified to these figures will be described.

Referring to Fig. 3, the sources 1 and 2 are coupled to rectifiers R and $R_1$ in such manner that the potentials from source 2 are impressed upon their input electrodes in the same phase and potentials from source 1 are impressed in opposite phase on the input electrodes of the respective rectifiers. The rectifiers are accordingly balanced with respect to the potentials from the sources. This result is achieved by reason of the particular relation of the primary windings of each of the two four-winding transformers. It is noted that a similar result would be achieved if the potentials from source 2 were impressed by a two-winding transformer on the common portion of the input circuits, as in Fig. 1 of United States patent to Carson, No. 1,343,307, June 15, 1920, which discloses a quite similar balanced tube arrangement, or by means of potentiometers as shown in Figs. 4 and 5. Any other arrangement of circuits having the same ultimate function may be used. This function is to effectively balance-out in the output circuit the effect of the potentials impressed in like phase on the input electrodes and to produce an unbalance due to these potentials by and in proportion to the potentials impressed in different phase on the input electrodes.

In the arrangement of Fig. 3, when the source 2 is used alone, there will be no potential difference between the plate terminals of impedances 10 and 11, which are respectively in the space current circuits of the two rectifiers, and consequently there will be no potential across galvanometer 6. When source 1 supplies current to the circuit there will be across the outside terminals of impedances 10 and 11 and therefore across the galvanometer, a potential which is proportional to the potential from source 1.

The system may be conveniently treated as a combination of two systems similar to that of Fig. 1, each consisting of one rectifier with its individual impedance and the two sources. For example, consider the rectifier R. If the potential from source 2 alone were impressed upon its input electrodes there would be produced across the impedance 10 potential variations having the same frequency as those impressed. If the galvanometer 6 were connected across the impedance, it would however, register a steady deflection.

If now, potentials from source 1, having the same frequency and phase, are impressed upon the input electrodes of the rectifier with those from source 2, or if the same relation is attained by adjusting the frequency and phase of the wave from source 2 with respect to the wave or component of the wave from source 1 as in the wave analysis method described above, there would be an increase in the steady deflection of the galvanometer. Similarly and simultaneously with the above operations in the case of rectifier $R_1$ there would be a decrease of deflection of a meter assumed to be connected across impedance 11 since the phases of the potentials impressed from the two sources on the input electrodes of this rectifier would be in opposition.

By arranging the galvanometer as shown relatively to these impedances, and by adjusting the impedances and other elements of the circuits so that the potentials across the two impedances, due to potentials from booster source 2 are equal, the tendencies towards deflections caused by the booster currents are balanced and the changes in potential due to the rectified current are additive with respect to the galvanometer, which registers the sum of such changes. Because of the balanced arrangement of the rectifier, the full scale of the meter can be used for the desired indication. The use of two rectifiers instead of one also doubles the value of the potential which is effective in actuating the galvanometer, so that the deflection is doubled.

If the frequencies are not identical but differ by a frequency to which the needle can respond, it will oscillate, both positive and negative impulses accordingly being effective to vary the deflection. If the beat frequency resulting from combining the impressed waves is made equal to the natural period of the meter needle an additional effect due to resonance may be obtained. In order to make use of deflections in both directions, a meter having a mid-scale zero reading should be used.

The circuit of Fig. 3 can be used according to any of the methods described with reference to Fig. 1. To mention only two of these methods, it can be used to measure the phase relation between currents or potentials having the same frequencies supplied by sources 1 and 2 or to adjust their phases to a desired relation. The operations according to these methods will be obvious from the description of the operation of the system of Fig. 1. It should be noted that whether the deflection is in one direction or the other depends on the connection of the galvanometer and the connection of the two sources. If any one of these connections is reversed, the direction of deflection is reversed. However, the direction of deflection is of little significance, since, when it is attempted to compare the phases of currents flowing in two electrically independent circuits, it is vain to attempt to distinguish between equality and opposition of phase.

Fig. 4 illustrates a system which functions in all respects like that of Fig. 3 but which is particularly adaptable for frequency calibration. Potential from alternating current source 2 is impressed in the same phase on the input circuits of the two rectifiers through a harmonic generator H and potentiometer 12. The harmonic generator may be simply an overloaded amplifier, i. e., an amplifier in which amplification is attended by distortion. A harmonic generator of this type is described in U. S. patent to Kendall, No. 1,446,752 of Feb. 27, 1923. In accordance with the general method described with reference to Fig. 1, the frequency of source 1 may be set to the fundamental frequency of the wave from source 2 or to any one of its harmonics. The method using a harmonic generator instead of the alternative method of varying the frequency of the wave from source 2 through the desired range and using the frequency directly is adapted for frequency calibrations of the sources used in multiplex carrier wave systems, since such systems are commonly of the harmonic type in which the various frequencies are harmonics of each other. The arrangement shown in this figure could be used to set the frequencies of the various carrier sources to various harmonics of a frequency from source 2, which might also constitute one of the carrier sources. A switch 14 may be actuated to either its upper or lower positions to provide for the operation of either rectifier separately. When thus operated, the system is the substantial equivalent of that shown in Fig. 1.

Fig. 5 illustrates an arrangement which may be used for analyzing a wave from source 1. The selective circuit 13 can be varied so as to be selective of current of any desired frequency. The combination of source 2 and the selective circuit accordingly, in effect, constitutes a standard calibrated source. A complex wave from source 1 may be explored by sequentially setting the frequency of the selective circuit at each of several values and then, for each of them varying the frequency of the source 2 through this value. A deflection of the meter indicates the presence in the complex wave of a component of that frequency. The amount of deflection gives the measure of the amplitude of the component. The present application is a continuation in part of application Serial No. 549,803, filed April 5, 1922, for "frequency indicators."

While certain circuit arrangements and specific details have been described for the purpose of completely disclosing the features of the invention, it is to be understood that this invention is not limited to such arrangements and details but only by the scope of the appended claims.

What is claimed is:

1. The method of detecting minute electrical variations using a rectifying device having a non-rectilinear characteristic over its conducting range, which consists in superposing the variations to be detected upon other electrical variations of substantially greater amplitude, rectifying both sets of variations, and indicating the rectified variations corresponding to a particular superposed frequency.

2. The method of detecting minute electrical variations using a rectifying device having a non-rectilinear characteristic over its conducting range, which consists in rectifying relatively larger variations with said device, indicating the rectified variations, supplying the minute variations to the rectifying device with said larger variations, and uniquely indicating the resultant rectified variations which have a given frequency corresponding to the frequency of said larger variations.

3. The method of detecting alternating electrical potentials using a non-rectilinear rectifier and a direct current indicating device, which comprises impressing on the rectifier other alternating potentials of which the maximum amplitude corresponds to a point on the impressed-potential-output-current characteristic curve of the rectifier where there is greater amplification than would result from impressing the first mentioned potentials on the rectifier, indicating the rectified potentials, supplying to the rectifier the first mentioned potentials and said other potentials and indicating the resultant rectified potentials.

4. The method of magnifying small alternating electrical potentials using a rectifier whose impressed-potential-output-current characteristic curve over its conducting range progressively increases in slope with increasing impressed potentials; which comprises impressing said potentials on said rectifier, and effectively boosting said potentials by superposing thereon other alternating potentials of such amplitude as to cause the first mentioned electrical potentials to vary over a portion of said characteristic having substantially greater amplification than at the lower end.

5. The method of magnifying minute potential variations using a rectifier whose impressed-potential-output-current characteristic curve over its conducting range progressively increases in slope with increasing impressed potentials which comprises boosting said minute variations by superposing thereon other variations of the same frequency, and rectifying and indicating said boosted minute variation.

6. A method of detecting minute electrical variations, using a unilateral conducting device having a non-rectilinear impressed-potential-output-current characteristic over its conducting range, which comprises causing the alternate half-waves of said variations which are capable of causing output current to flow, to occur over a portion of the characteristic curve, exclusive of the foot portion, where the amplification is greater than at the foot of the curve.

7. A method of detecting minute electrical potentials, using a unilaterally conducting device having a non-rectilinear impressed-potential-output-current characteristic over its conducting range, comprising synchronously boosting said potentials, impressing the boosted potentials on said device and indicating the resultant rectified product.

8. A method of detecting minute alternating potentials, using an electric discharge amplifier having a cathode, an anode and an impedance control electrode, which comprises impressing such a polarizing potentials between said cathode and control electrode that only alternate half-waves of impressed alternating potentials are amplified, impressing said minute alternating potentials between said cathode and control electrode, synchronously boosting said impressed potentials so that they vary over a portion of the impressed-potential-output-current curve for the operating range characterized by large amplification, and indicating the resultant rectified product.

9. A method of detecting minute electrical potentials, using a unilaterally conducting device having an impressed-potential-output-current curve over its conducting range which progressively increases in slope with increasing impressed potentials which comprises impressing said potentials on said device; synchronously boosting said potentials to a point on the curve characterized by relatively large amplification, balancing out the rectified boosting potentials in the output circuit of the device, and indicating the resultant amplified and rectified impressed potentials.

10. A method of detecting minute electrical potential, using two unilaterally conducting devices each having an impressed-potential-output-current curve over its conducting range which progressively increases in slope with increasing impressed potentials which comprises impressing said potentials on said devices so that alternate half-waves are rectified by the respective devices, synchronously impressing boosting potentials on said devices so that said first mentioned potentials are effectively caused to vary over a range of potentials corresponding to portions of the curves of the respective devices characterized by relatively large amplification, balancing out the boosting potentials in the output circuits of said devices, and superposing in additive relation and indicating the resultant amplified and rectified impressed potentials.

11. A method of detecting minute electrical potential variations using a unilaterally conducting device having an impressed-potential-output-current curve over its conducting range which progressively increases in slope with increasing impressed potentials and a direct current galvanometer, which comprises impressing said variations on said device, superposing thereon booster variations, the difference between the frequencies of said variations being less than the frequency to which the moving parts of the meter can respond, and said booster variations having such an amplitude as to cause the minute impressed variations to effectively occur over a potential range corresponding to a portion of the curve characterized by relatively large amplification, and indicating the resultant variable current.

12. The method defined in claim 11, in which the difference between the frequencies of the two impressed variations equals the natural frequency of mechanical vibration of the moving parts of the galvanometer.

13. The method defined in claim 11 in which the rectified boosting variations are balanced out in the output circuit of the device before indication.

14. The method of claim 11, in which the difference between the frequencies of the two impressed variations is equal to the natural frequency of mechanical vibration of the moving parts of the galvanometer and in which the rectified boosting variations are balanced out in the output of the device before indication.

15. The method of wave analysis, using a calibrated variable frequency source, a unilaterally conducting device having an impressed-potential-output-current curve over its conducting range which progressively increases in slope with increasing impressed potentials and a direct current galvanometer connected to the output of said device, which comprises superposing on said device the wave under test and a wave from said source the potential of which varies to a maximum value corresponding to a point on said curve where the amplification is relatively great, indicating the resultant rectified current and slowly varying the frequency of the wave from said source through the range of possible frequencies in the test wave, the frequency components in the test wave being indicated approximately by the frequency of the wave from said source when the needle of the galvanometer begins to oscillate and being indicated exactly by the frequency of the wave from said source when it is such as to produce a permanent change of deflection of the needle.

16. The method of measuring an unknown frequency using a calibrated variable frequency source, a unilaterally conducting device having an impressed-potential-output-current curve over its conducting range which progressively increases in slope from its lower end and a direct current galvanometer connected to the output of said device, which comprises superposing on said device the wave under test and a wave from said source, the potential of which varies to a maximum value corresponding to a point on said curve where the amplification is relatively great, indicating the resultant rectified current, and slowly varying the frequency from said source until the needle of the meter assumes a steady deflection different from its initial deflection.

17. The method of claim 15 in which the rectified wave from said source is balanced out in the output circuit of the device before indication.

18. The method of determining if a given test wave has a component of a given frequency, using a calibrated variable frequency source, a unilaterally conducting device having a non-rectilinear impressed-potential-output-current curve over its conducting range and a direct current galvanometer having a known natural frequency, which comprises superposing on said device the test wave and the wave from said source and varying the frequency of the wave from said source until it differs from the given frequency by the natural frequency of the meter, a sudden and a relatively violent series of oscillations of the galvanometer needle indicating the presence of the desired frequency component.

19. The method of claim 18, in which the potential of the wave from said source varies to a maximum value corresponding to a point on the impressed-potential-output-current wave of the device where the amplification is substantially greater than near its foot.

20. The method of claim 18, in which the potential of the wave from said source varies to a maximum value corresponding to a point on the impressed-potential-output-current curve of the device where the amplification is substantially a maximum.

21. The method of adjusting the phase of an alternating electrical wave to a given phase relation with another alternating electrical wave of the same frequency, one of said waves having a relatively small amplitude, using a unilateral conducting device having an impressed-potential-output current curve over its conducting range which progressively increases in slope with increasing impressed potentials and a direct current galvanometer connected to the output circuit of said device, which comprises separately impressing the two waves on said device and indicating by the galvanometer their respective rectified values and then superposing the waves on the device and indicating the rectified value of the combined wave, the relative phases being a function of the relation of the difference between the second and third indications and the first indication.

22. An electric apparatus comprising rectifiers connected in balanced relation, means for supplying energy waves from a plurality of sources to said rectifiers so that the phase relation of said waves controls the balance of said rectifiers, and means associated with said rectifiers for indicating an unbalanced condition.

23. An electric apparatus comprising a plurality of three electrode space discharge rectifiers connected in balanced relation, each having a control electrode and an output circuit, means for supplying to the control electrodes of said rectifiers potentials determined by the phase relation of a plurality of electric waves, and an indicator associated with the output circuits of said rectifiers.

24. An electric apparatus comprising a plurality of rectifying devices each having a control electrode and an output circuit, the internal output impedances of said rectifiers being included in two corresponding arms of a Wheatstone bridge, means controlled by the phase relation of a plurality of electric waves for determining the potential charges impressed upon the control electrodes of said rectifiers, and an indicating means associated with said output circuits.

25. In combination with a Wheatstone bridge having two corresponding arms constituted by the internal output impedances of two thermionic rectifiers of means controlled by the phase relation of two electric waves for unbalancing said bridge arms and an indicator associated with said bridge.

26. A frequency calibrating means comprising a plurality of rectifying devices, each having a control element and an output circuit, an indicator associated with said output circuit, and means depending upon the phase relation of two electric waves for controlling said indicator.

27. A frequency calibrating means comprising a plurality of rectifying devices, each having a control electrode, and an output circuit, means for supplying electric waves from a plurality of sources in fixed phase relation to said control electrodes, and an indicator associated with said output circuits adapted to be controlled by the instantaneous phase relation of the waves.

28. A frequency calibrating means comprising a Wheatstone bridge, two corresponding arms of which include the internal output impedances of two thermionic rectifiers, an indicator associated with said bridge, and means supplying a plurality of electric waves to control the impedances of said rectifiers and hence the balanced condition of the bridge.

29. A frequency calibrating means comprising a Wheatstone bridge having two corresponding arms constituted by the internal output impedances of two thermionic rectifiers, an indicator associated with said bridge, and means supplying a plurality of electric waves to control the impedances of said rectifiers and hence the balanced condition of the bridge.

30. A frequency calibrating means comprising a Wheatstone bridge, an indicator, and means for affecting the impedances of two corresponding arms thereof under the control of a source of known frequency and a source of unknown frequency.

31. A frequency calibrating means comprising a Wheatstone bridge, and means for changing the impedance relation of two corresponding arms of said bridge by the conjoint action of waves of different frequencies.

32. An electric apparatus comprising a plurality of three-electrode rectifiers having their output internal impedances connected as the corresponding arms of a Wheatstone bridge, and means for controlling the impedances of said rectifiers by the cooperative action of a plurality of electric waves.

33. An electric apparatus comprising a plurality of three-electrode rectifiers having their output internal impedances connected to constitute the corresponding arms of a Wheatstone bridge, means for controlling the output impedances of said rectifiers in accordance with the phase relation of waves supplied by a plurality of sources, and an indicator associated with said bridge.

34. An electric apparatus comprising balanced three-electrode rectifiers, means for supplying electric waves of different frequencies to the input circuits of said rectifiers, and indicating means associated with the rectifier output circuits adapted to be actuated when the frequencies of the waves are approximately the same.

35. An electric apparatus comprising a Wheatstone bridge having the internal output impedances of a plurality of rectifiers constituting corresponding arms of said bridge, a plurality of sources of electric waves, and indicating means adapted to be actuated when the frequencies of the waves supplied by said sources are approximately the same.

36. A frequency calibrating means comprising a Wheatstone bridge, an indicator, a source of known frequency, a source of unknown frequency and means for controlling the impedances of two corresponding arms of said bridge by the joint action of said sources of known and unknown frequencies.

37. A frequency calibrating means comprising a Wheatstone bridge, an indicator, a source of known frequency, a source of unknown frequency and means for differently affecting the impedances of two corresponding arms of said bridge by the joint action of said sources of known and unknown frequencies.

38. A frequency calibrating means comprising a Wheatstone bridge, an indicator, a source of known frequency, a source of unknown frequency and means for variably affecting the impedances of two corresponding arms of said bridge by the joint action of said sources of known and unknown frequencies.

39. A frequency calibrating means comprising a Wheatstone bridge, an indicator, a source of known frequency, a source of unknown frequency, a harmonic generator, means for supplying energy from said known frequency source through the harmonic generator and means for controlling the impedances of two corresponding arms of said bridge by the joint action of said sources of known and unknown frequencies.

40. A frequency calibrating means comprising a plurality of three-electrode rectifiers, a Wheatstone bridge having the internal output impedances of said rectifiers included in corresponding arms thereof, a harmonic generator, means for supplying energy from said known frequency source through the harmonic generator to the control electrodes of said rectifiers, means for supplying energy of said unknown frequency source to the control electrodes of said rectifiers and an indicator associated with said bridge.

41. A frequency calibrating means comprising a plurality of three-electrode rectifiers, a Wheatstone bridge having the internal output impedances of said rectifiers constituting the corresponding arms thereof, a harmonic generator, means for supplying energy from a known frequency source through the harmonic generator to the control electrodes of said rectifiers, means for supplying energy of an unknown frequency source to the control electrodes of said rectifiers in opposite phase relation and an indicator associated with said bridge.

42. The method of using a calibrated variable frequency wave, a combining device, and a frequency selective means to indicate the amplitudes of the different frequency components present in a complex wave, which comprises superposing the complex wave and the wave from said source in said combining device, varying the frequency of the wave from said source until it differs from the frequency of the given component by the selective frequency of said means as determined by a resonant response of said means, and producing by the response of the selective means an indication which is proportional to the amplitude of each component.

43. The method of using a calibrated variable frequency wave, a combining device, and a frequency selective means to indicate the frequency of the different components present in a complex wave, which comprises impressing the variable frequency wave and the complex wave upon the combining device, varying the frequency of the first wave to produce a beat current corresponding to the resonant frequency of the selective means, and producing an indication by the response of the selective means.

44. A wave analyzing system comprising in combination, a source of waves to be analyzed, means including a calibrated variable frequency source for sweeping the possible range of frequencies in the waves under analysis, means for combining the waves from said sources to produce a beat current, a frequency selective means for selecting the beat current produced by combining the adjusted frequency wave with a frequency component in the waves under analysis, and means controlled by the response of said selective means for indicating the presence of such frequency component in the wave under analysis.

45. A method of operating on electrical waves, using a non-linear electric discharge rectifier whereby alternate half-cycles only of the impressed waves are transmitted and the transmitted elements are changed in amplitude proportionally as their respective amplitudes, which comprises impressing an electrical wave on said rectifier, and increasing the amplitude of each element of the impressed wave as it is impressed thereon.

In witness whereof, I hereunto subscribe my name this 31st day of October, A. D. 1924.

JOSEPH W. HORTON.